United States Patent [19]

Hwang et al.

[11] Patent Number: 6,001,873

[45] Date of Patent: Dec. 14, 1999

[54] PROCESS FOR PREPARING A HIGH PURITY EPOXY RESIN

[75] Inventors: Kuen Yuan Hwang; Hong-Hsing Chen; An Bang Duh; Chie-Yih Ju, all of Hsinchu, Taiwan

[73] Assignee: Chang Chun Plastics Co., Ltd., Taipei, Taiwan

[21] Appl. No.: 08/865,671

[22] Filed: May 30, 1997

[30] Foreign Application Priority Data

Dec. 31, 1996 [TW] Taiwan ................................ 85116329

[51] Int. Cl.⁶ .......................... C08G 59/68; C08G 65/10
[52] U.S. Cl. .......................... 514/517; 549/514; 528/95; 528/409; 528/413; 525/507
[58] Field of Search ........................ 525/507; 528/409, 528/413, 95; 549/517, 514

[56] References Cited

U.S. PATENT DOCUMENTS 5,028,686  7/1991  Liao et al. ................................ 528/92

FOREIGN PATENT DOCUMENTS 58-189223    11/1983   Japan .
61-195111     8/1986   Japan .
B2-62-34330   7/1987   Japan .

Primary Examiner—Frederick Krass
Attorney, Agent, or Firm—Birch, Stewart, Kolasch & Birch, LLP

[57] ABSTRACT

This invention relates to a process for preparing a high purity epoxy resin comprising reacting an aromatic compound containing hyroxyl or amino group with an excess amount of an epihalohydrin in the presence of hydroxides of alkali metal or alkali earth metal in one or more low-boiling aprotic cosolvents under normal or reduced pressure with dewatering to obtain a high purity epoxy resin with low level of hydrolyzable halides.

12 Claims, No Drawings

PROCESS FOR PREPARING A HIGH PURITY EPOXY RESIN

BACKGROUND OF THE INVENTION

Epoxy resins have been widely used in microeletrical industry as an encapsulating material to encapsulate semiconductor devices. The epoxy resins used as an encapsulating material mostly contain o-cresol novolac epoxy resin as a main ingredient. Thus the purity of the epoxy resin determines the purity of the encapsulating material prepared therefrom and also directly affects a reliance and a life of a semiconductor device encapsulated with the encapsulating material. The purity of the o-cresol novolac epoxy resin mainly depends on the content of halides and the presence of volatile substances therein. Generally, halides content above a certain level will cause a corrosion of wires on a wafer and then cause a damage of the wafer. Moreover, the presence of the volatile substances will cause a reduction of heat resistance of a solder and result in the release of the resin encapsulant from the wafer. Therefore, reducing the halides contents and removing of volatile substances are very important for an epoxy resin for encapsulating a semiconductor.

In a process for preparing a high purity epoxy resin, one or more organic solvents are used to aid the reaction. If such a process uses an alcohol as the solvent, and inter reaction between an active hydrogen on the alcohol and the epihalohydrin will occur to produce undesirable by-product. To avoid the production of the by-product, there are many patents disclosing the use of a solvent containing no active hydrogen, for example Japanese Patent Examined Publication No. 62-34330 and Japanese Patent Unexamined Publication No. 61-195111. However, the halide content of the epoxy resin prepared by the processes does not meet the requirement of high purity required by the microelectrical industry. Additionally, Japanese Patent Unexamined Publication No. 58-189223 disclosed a process for preparing an epoxy resin in high purity by using high-boiling solvent. However, the process will cause the contamination of the epoxy resin.

In view of this, the present inventors have widely investigated on the process for preparing epoxy resins and found that an epoxy resin with high purity and low halide content can be obtained by using specific solvents and thus completed this invention.

OBJECT OF THE INVENTION

It is an object of the present invention to provide a process for preparing a high purity epoxy resin.

DETAILED DESCRIPTION OF THE INVENTION

The present invention provides a process for preparing a high purity epoxy resin, which comprises reacting an epihalohydrin with an aromatic compound containing hydroxyl or amino group in the presence of hydroxides of alkali metal or alkali earth metal in one or more organic solvents to obtain a high purity epoxy resin.

According to the process of the present invention, the prepared epoxy resin contains less than 350 ppm of hydrolyzable halides without remaining solvents to contaminate the resin. Therefore the epoxy resin prepared by the process of the present invention is advantageously used in the microelectrical industry.

The organic solvents used in the process of the present invention may meet the following requirements:

(a) they are an aprotic solvent,
(b) their boiling point is lower than that of reactants;
(c) they can form an azeotrope with water;
(d) they are immiscible with water; and
(e) their water solubility is less than 10%.

The examples of the solvents include, for example, an ester of secondary or tertiary alcohol such as isopropyl acetate.

The solvents used in the present invention may be a mixture of said ester and one or more other solvents for example propylene glycol $C_{1-5}$ alkyl ethers such as propylene glycol methyl ether, propylene glycol ethyl ether, propylene glycol propyl ether, propylene glycol n-butyl ether, propylene glycol tert-amyl ether etc.

The total amount of the solvents used is 5~100% by weight, preferably 10~80% by weight and more preferably 20~70% by weight based on the total weight of the epihalohydrin used. In case of using a mixture of isopropyl acetate and the other solvents as the cosolvent, the amount of the other solvents is 0~100% by weight of isopropyl acetate.

Examples of the aromatic compound containing hydroxyl or amino group used in the process of the present invention include, for example, resorcin, pyrocatechol, hydroquinone, Bisphenol A, Bisphenol F, Bisphenol S, 2, 2', 6, 6'-tetramethylbisphenol, phenol formaldehyde novolac resin, cresol formaldehyde novolac resin, methylenedianiline and a mixture thereof.

Examples of the hydroxide of alkali metal or alkali earth metal used in the process of the present invention include sodium hydroxide, potassium hydroxide, lithium hydroxide, calcium hydroxide, barium hydroxide, magnesium hydroxide and a mixture thereof. The hydroxide of alkali metal or alkali earth metal is used in the form of an aqueous solution or an organic solution. Examples of the organic solvent capable of dissolving said hydroxide of alkali metal or alkali earth metal include, for example, alcohols such as methanol, ethanol, isopropanol, sulfoxides such as dimethylsulfoxide, and acetamides such as dimethylacetamide, dimethylformamide and a mixture thereof. Among them, said hydroxide of alkali metal or alkali earth metal is preferably used in the form of an aqueous solution.

The concentration of the hydroxide of alkali metal or alkali earth metal is 5~75% by weight, preferably 25~5% by weight, more preferably 40~55% by weight. The mole equivalent ratio of the hydroxide to the aromatic compound containing hydroxyl or amino group is 0.9~1.1:1.

Examples of the epihalohydrin used in the process of the present invention include epichlorohydrin, epibromohydrin, epiiodohydrin, methyl-epichlorohydrin, methyl-epibromohydrin, methyl-epiiodohydrin or a mixture thereof The amount of the epihalohydrin used is 1~10 mole equivalents, preferably 2~8 mole equivalents and more preferably 4~7 mole equivalents relative to the aromatic compound containing hydroxyl or amino group.

The present invention is described in more details by means of, but is not limited to, the following examples and comparative examples.

In the following examples, the content of hydrolyzable halide is determined as follows:

1 g of the sample was placed in 30 ml of dioxane. To the solution was added 50 ml of 1N KOH. The mixture was refluxed for 30 minutes and titrated with 0.002 N $AgNO_3$ by using potentiometric differential titration method to determine the content of hydrolyzable halide.

EXAMPLE 1

To a one liter 4-neck reactor equipped with a device for controlling and showing the temperature and pressure and a device for condensing codistillate mixture of water, epihalohydrin and the solvents and separating them into an organic phase and an aqueous phase, were added 100 g (0.83 mole) of o-cresol-formaldehyde novolac resin having 5~6 of average polymerization degree of aromatic hydroxyl group, 463 g (5.00 mole) of epichlorohydrin and 198 g of isopropyl acetate as the solvent. The mixture was stirred to form homogeneous solution under atmospheric pressure and then heated to 60° C. under absolute pressure of 190 mm Hg. After reaching equilibrium of the pressure and the temperature, to the mixture was added 65 g (0.83 mole) of 50% aqueous sodium hydroxide solution at a constant rate over four hours while water contained in the reaction system was azeotropically distilled and condensed. The condensed azeotrope was separated into an organic phase and an aqueous phase, the organic phase was sequentially recycled into the reaction system and the aqueous phase was discarded. After the reaction had completed, unreacted epichlorohydrin and the solvent were distilled off under reduced pressure. Sodium chloride contained in the resulting crude epoxy resin was dissolved in toluene and deionized water and washed off with water. The solvent was distilled from the resulting mixture under reduced pressure to obtain 145 g of pale yellow epoxy resin. During the reaction, the separated aqueous phase from the azeotropic mixture contained 0.7% of organic solvent. The resulting epoxy resin had 201 equivalents of epoxy, and contained 300 ppm of hydrolyzable halide content.

EXAMPLE 2

To a one liter 4-neck reactor equipped with a device for controlling and showing the temperature and pressure and a device for condensing codistillate mixture of water, epihalohydrin and the solvents and separating them into an organic phase and an aqueous phase, were added 100 g (0.83 mole) of o-cresol-formaldehyde novolac resin having 5~6 of average polymerization degree of aromatic hydroxyl group, 463 g (5.00 mole) of epichlorohydrin and 178 g of isopropyl acetate and 20 g of propylene glycol methyl ether as the solvent. The mixture was stirred to form a homogeneous solution under atmospheric pressure and then heated to 60° C. under absolute pressure of 190 mm Hg. After reaching equilibrium of the pressure and the temperature, to the mixture was added 65 g (0.83 mole) of 50% aqueous sodium hydroxide solution at a constant rate over four hours while water contained in the reaction system was azeotropically distilled and condensed. The condensed azeotrope was separated into an organic phase and an aqueous phase, the organic phase was sequentially recycled into the reaction system and the aqueous phase was discarded. After the reaction had completed, unreacted epichlorohydrin and the solvent were distilled off under reduced pressure. Sodium chloride contained in the resulting crude epoxy resin was dissolved in toluene and deionized water and washed off with water. The solvent was distilled from the resulting mixture under reduced pressure to obtain 145 g of pale yellow epoxy resin. During the reaction, the separated aqueous phase from the azeotropic mixture contained 3.0% of organic solvent. The resulting epoxy resin had 199 equivalents of epoxy and contained 340 ppm of hydrolyzable halide content.

Comparative Example 1

To a one liter 4-neck reactor equipped with a device for controlling and showing the temperature and pressure and a device for condensing codistillate mixture of water, epihalohydrin and solvents and separating them into an organic phase and an aqueous phase, were added 100 g (0.83 mole) of o-cresol-formaldehyde novolac resin having 5~6 of average polymerization degree of aromatic hydroxyl group, 463 g (5.00 mole) of epichlorohydrin and 178 g of methyl ethyl ketone as the solvent. The mixture was stirred to form a homogeneous solution under atmospheric pressure and then heated to 60° C. under absolute pressure of 190 mm Hg. After reaching equilibrium of the pressure and the temperature, to the mixture was added 65 g (0.83 mole) of 50% aqueous sodium hydroxide solution at a constant rate over four hours while water contained in the reaction system was azeotropically distilled and condensed. The condensed azeotrope was separated into an organic phase and an aqueous phase, the organic phase was sequentially recycled into the reaction system and the aqueous phase was discarded. After the reaction had completed, unreacted epichlorohydrin and the solvent were distilled off under reduced pressure. Sodium chloride contained in the resulting crude epoxy resin was dissolved in toluene and deionized water and washed off with water. The solvent was distilled from the resulting mixture under reduced pressure to obtain 135 g of pale yellow epoxy resin. During the reaction, the separated aqueous phase from the azeotropic mixture contained 7.0% of organic solvent, the resulting epoxy resin had 199 equivalents of epoxy and contained 420 ppm of hydrolyzable halide content.

Comparative Example 2

To a one liter 4-neck reactor equipped with a device for controlling and showing the temperature and pressure and a device for condensing codistillate mixture of water, epihalohydrin and solvents and separating them into an organic phase and an aqueous phase, were added 100 g (0.83 mole) of o-cresol-formaldehyde novolac resin having 5~6 of average polymerization degree of aromatic hydroxyl group, 463 g (5.00 mole) of epichlorohydrin and 178 g of dioxane as the solvent. The mixture was stirred to form a homogeneous solution under atmospheric pressure and then heated to 60° C. under absolute pressure of 190 mm Hg. After reaching equilibrium of the pressure and the temperature, to the mixture was added 65 g (0.83 mole) of 50% aqueous sodium hydroxide solution at a constant rate over four hours while water contained in the reaction system was azeotropically distilled and condensed. The condensed azeotrope was separated into an organic phase and an aqueous phase, the organic phase was sequentially recycled into the reaction system and the aqueous phase was discarded. After the reaction had completed, unreacted epichlorohydrin and the solvent were distilled off under reduced pressure. Sodium chloride contained in the resulting crude epoxy resin was dissolved in toluene and deionized water and washed off with water. The solvent was distilled from the resulting mixture under reduced pressure to obtain 130 g of pale yellow epoxy resin. During the reaction, the separated aqueous phase from the azeotropic mixture contained 21.0% of organic solvent, the resulting epoxy resin had 200 equivalents of epoxy and contained 430 ppm of hydrolyzable halide content.

What is claimed is:

1. A process for preparing an epoxy resin having less than 350 ppm hydrolyzable halide, as determined by mixing the epoxy resin with dioxane and KOH and titrating with AgNO₃ to measure the amount of hydrolyzable halide, which comprises reacting an epihalohydrin with an aromatic compound containing hydroxy or amino group in an organic solvent in the presence of hydroxide of alkali metal or alkali earth metal;

wherein said organic solvent is an aprotic solvent, which has a boiling point lower than that of the reactants, can form an azeotrope with water, is immiscible with water and has a water solubility of less than 10%.

2. The process according to claim 1, wherein said hydroxide of alkali metal or alkali earth metal is used in an amount of 0.9~1.1 mole equivalent based on the mole equivalent of said aromatic compound containing hydroxy or amino group.

3. The process according to claim 1, wherein said epihalohydrin is used in an amount of 1 to 10 mole equivalent based on the aromatic compound containing hydroxy or amino group.

4. The process according to claim 1, which further comprises the step of azeotropically distilling the excess water and the produced water at a temperature of 35~100° C. under reduced pressure or ambient pressure during the reaction; wherein the aqueous phase in the azeotrope contains less than 5.0% of the organic solvent.

5. The process according to claim 1, wherein said organic solvent is an ester of a secondary or tertiary alcohol.

6. A process for preparing an epoxy resin having less than 350 ppm hydrolyzable halide, as determined by mixing the epoxy resin with dioxane and KOH and titrating with $AgNO_3$ to measure the amount of hydrolyzable halide, which comprises reacting an epihalohydrin with an aromatic compound containing hydroxy or amino group in an organic solvent in the presence of hydroxide of alkali metal or alkali earth metal;

wherein said organic solvent is isopropyl acetate.

7. The process according to claim 1, wherein said organic solvent is optionally further mixed with at least one solvent which is a proplyene glycol $C_{1-5}$ alkyl ether.

8. The process according to claim 7, wherein said propylene glycol C1–5 alkyl ethers are selected from the group consisting of propylene glycol methyl ether, propylene glycol ethyl ether, propylene glycol propyl ether, propylene glycol n-butyl ether and propylene glycol t-amyl ether.

9. The process according to claim 1, wherein said epihalohydrin is selected from the group consisting of epichlorohydrin, epibromohydrin, epoxyiodiopropane, methylepichlorohydrin, methylepibromohydrin, methylepiiodohydrin and a mixture thereof.

10. The process according to claim 9, wherein said epihalohydrin is epichlorohydrin.

11. The process according to claim 1, wherein said hydroxide of alkali metal or alkali earth metal is sodium hydroxide, potassium hydroxide or a mixture thereof.

12. The process according to claim 1, wherein said aromatic compound containing hydroxy or amino group is resorcin, pyrocatechol, hydroquinone, Bisphenol A, Bisphenol F, Bisphenol S, 2, 2', 6, 6'-tetramethylbisphenol phenol formaldehyde novolac resin, cresol formaldehyde novolac resin, methylenedianiline or a mixture thereof.

* * * * *